United States Patent
Itay et al.

(10) Patent No.: US 8,763,914 B2
(45) Date of Patent: Jul. 1, 2014

(54) DECOUPLED CONTACTLESS BI-DIRECTIONAL SYSTEMS AND METHODS

(75) Inventors: Hemy Itay, Rosh Pina (IL); Oded Bashan, Rosh Pina (IL)

(73) Assignee: On Track Innovations Ltd., Rosh Pina (IL)

( * ) Notice: Subject to any disclaimer, the term of this patent is extended or adjusted under 35 U.S.C. 154(b) by 150 days.

(21) Appl. No.: 13/351,883

(22) Filed: Jan. 17, 2012

(65) Prior Publication Data
US 2013/0181056 A1   Jul. 18, 2013

(51) Int. Cl.
| G06K 19/06 | (2006.01) |
| G06K 19/00 | (2006.01) |
| G05B 19/00 | (2006.01) |
| G05B 23/00 | (2006.01) |
| G06F 7/00 | (2006.01) |
| G06F 7/04 | (2006.01) |

(52) U.S. Cl.
USPC ........ 235/492; 235/487; 235/493; 340/572.1; 340/5.86; 340/5.8

(58) Field of Classification Search
USPC ........ 235/487, 493, 492; 340/572.1, 5.8, 5.86
See application file for complete search history.

(56) References Cited

U.S. PATENT DOCUMENTS

| 4,135,183 | A | 1/1979 | Heltemes | |
|---|---|---|---|---|
| 5,072,222 | A | 12/1991 | Fockens | |
| 5,884,271 | A | 3/1999 | Pitroda | |
| 7,243,840 | B2 * | 7/2007 | Bason et al. | 235/380 |
| 7,268,687 | B2 * | 9/2007 | Egbert et al. | 340/572.7 |
| 7,546,671 | B2 * | 6/2009 | Finn | 29/592.1 |
| 7,591,415 | B2 * | 9/2009 | Jesme | 235/380 |
| 7,806,333 | B1 * | 10/2010 | McReynolds et al. | 235/450 |
| 7,834,816 | B2 * | 11/2010 | Marino et al. | 343/867 |
| 7,847,698 | B2 * | 12/2010 | Rancien et al. | 340/572.8 |
| 7,940,185 | B2 * | 5/2011 | Rancien et al. | 340/572.8 |
| 8,344,958 | B2 * | 1/2013 | Artigue et al. | 343/728 |
| 2001/0011012 | A1 * | 8/2001 | Hino et al. | 455/90 |
| 2005/0128085 | A1 * | 6/2005 | Bon | 340/572.7 |
| 2006/0065714 | A1 * | 3/2006 | Jesme | 235/380 |
| 2006/0202835 | A1 | 9/2006 | Thibault | |
| 2007/0096924 | A1 | 5/2007 | Horne | |
| 2007/0164867 | A1 * | 7/2007 | Kawai | 340/572.7 |
| 2008/0002379 | A1 * | 1/2008 | Launay | 361/757 |
| 2008/0072423 | A1 * | 3/2008 | Finn | 29/854 |
| 2008/0128514 | A1 * | 6/2008 | Sabbah et al. | 235/492 |

(Continued)

FOREIGN PATENT DOCUMENTS

JP        3832363        9/2003

OTHER PUBLICATIONS

Bernhard et al., RFID in Metallic Environment, http://www.rfid-systech.eu/20070613_3A_1010_Bernhard_RFID_inMetallicEvnironment.PDF, Jun. 13, 2007.

(Continued)

*Primary Examiner* — Daniel Walsh
(74) *Attorney, Agent, or Firm* — Pearl Cohen Zedek Latzer Baratz LLP

(57) ABSTRACT

A contactless bi-directional device including first and second generally mutually electromagnetically decoupled contactless loop antennas which are arranged in at least partially mutually overlapping orientation, first and second contactless communication chips, each of the first and second communications chips being connected to a corresponding one of the generally mutually electromagnetically decoupled contactless loop antennas, thereby providing bi-directional communication.

32 Claims, 8 Drawing Sheets

(56) References Cited

U.S. PATENT DOCUMENTS

| | | |
|---|---|---|
| 2009/0058744 A1 | 3/2009 | Marino |
| 2009/0121964 A1* | 5/2009 | Yamada et al. ............... 343/866 |
| 2009/0152363 A1* | 6/2009 | Kim .............................. 235/492 |
| 2009/0201157 A1 | 8/2009 | Forster |
| 2009/0224888 A1* | 9/2009 | Caruana ...................... 340/10.2 |
| 2009/0229109 A1* | 9/2009 | Finn ............................... 29/601 |
| 2009/0315680 A1* | 12/2009 | Arimura ...................... 340/10.1 |
| 2010/0213261 A1* | 8/2010 | Caruana ....................... 235/486 |
| 2010/0282855 A1* | 11/2010 | Rancien et al. ............... 235/492 |
| 2010/0295290 A1* | 11/2010 | Muth et al. ................... 283/109 |
| 2010/0295750 A1* | 11/2010 | See et al. ...................... 343/893 |
| 2011/0002107 A1* | 1/2011 | Tanaka et al. ................ 361/762 |
| 2011/0121080 A1* | 5/2011 | Kai et al. ...................... 235/488 |
| 2011/0155811 A1* | 6/2011 | Rietzler ........................ 235/488 |
| 2011/0156864 A1* | 6/2011 | Green ............................ 340/5.2 |
| 2012/0139703 A1* | 6/2012 | Szoke et al. .................. 340/5.83 |
| 2012/0169472 A1* | 7/2012 | Ikemoto ...................... 340/10.1 |
| 2013/0075477 A1* | 3/2013 | Finn et al. .................... 235/492 |

OTHER PUBLICATIONS

AAN PT9S Long Range Antenna for cattle ID, http://www.trovan.com/products/FDXB/FDXBfixed/FDXBfixed.html, commercially available from NSG Digital Systems of Kedah, Malaysia, Nov. 4, 2013.

International Search Report of Application No. PCT/IL13/50038 mailed on May 21, 2013.

* cited by examiner

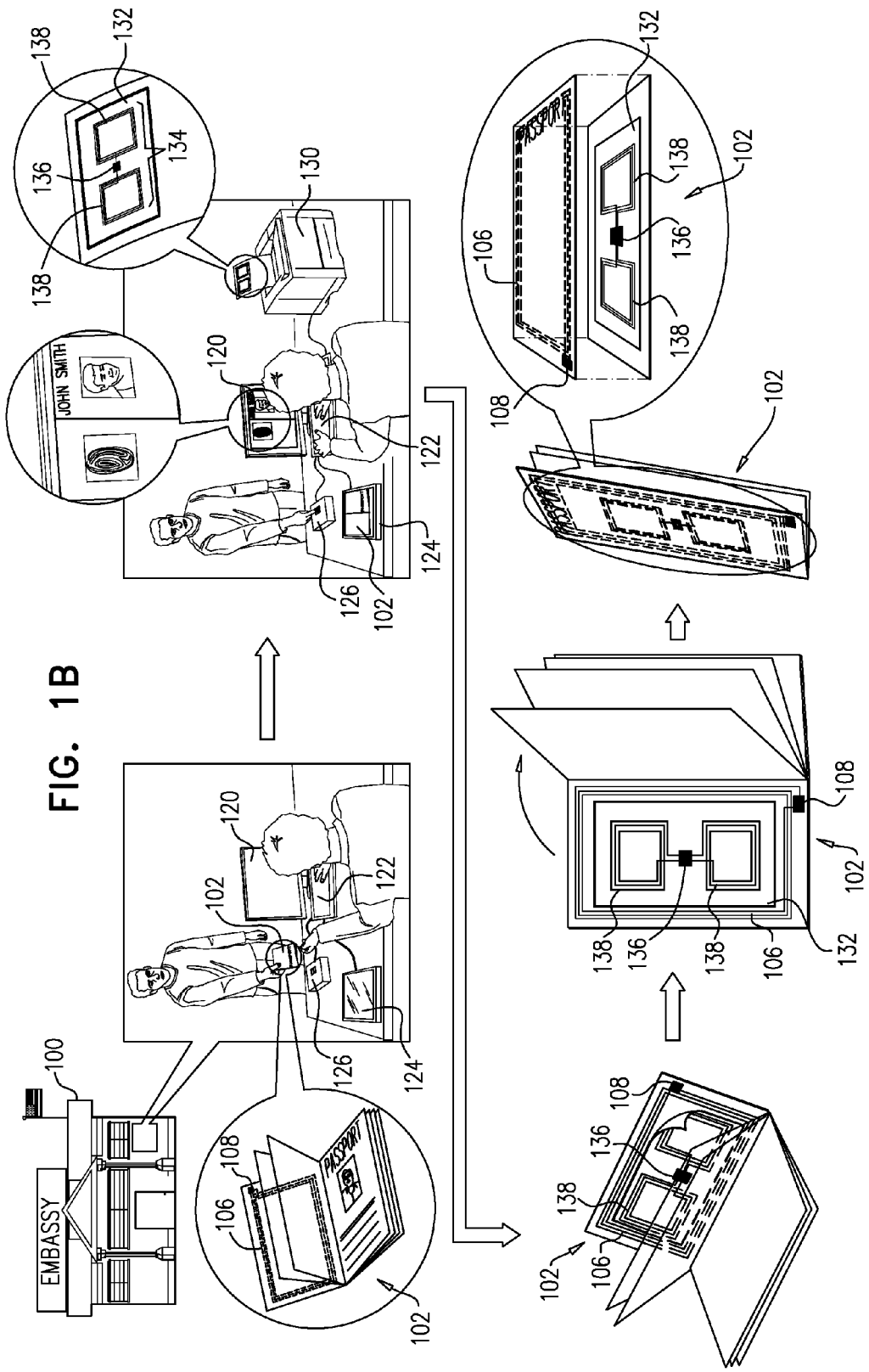

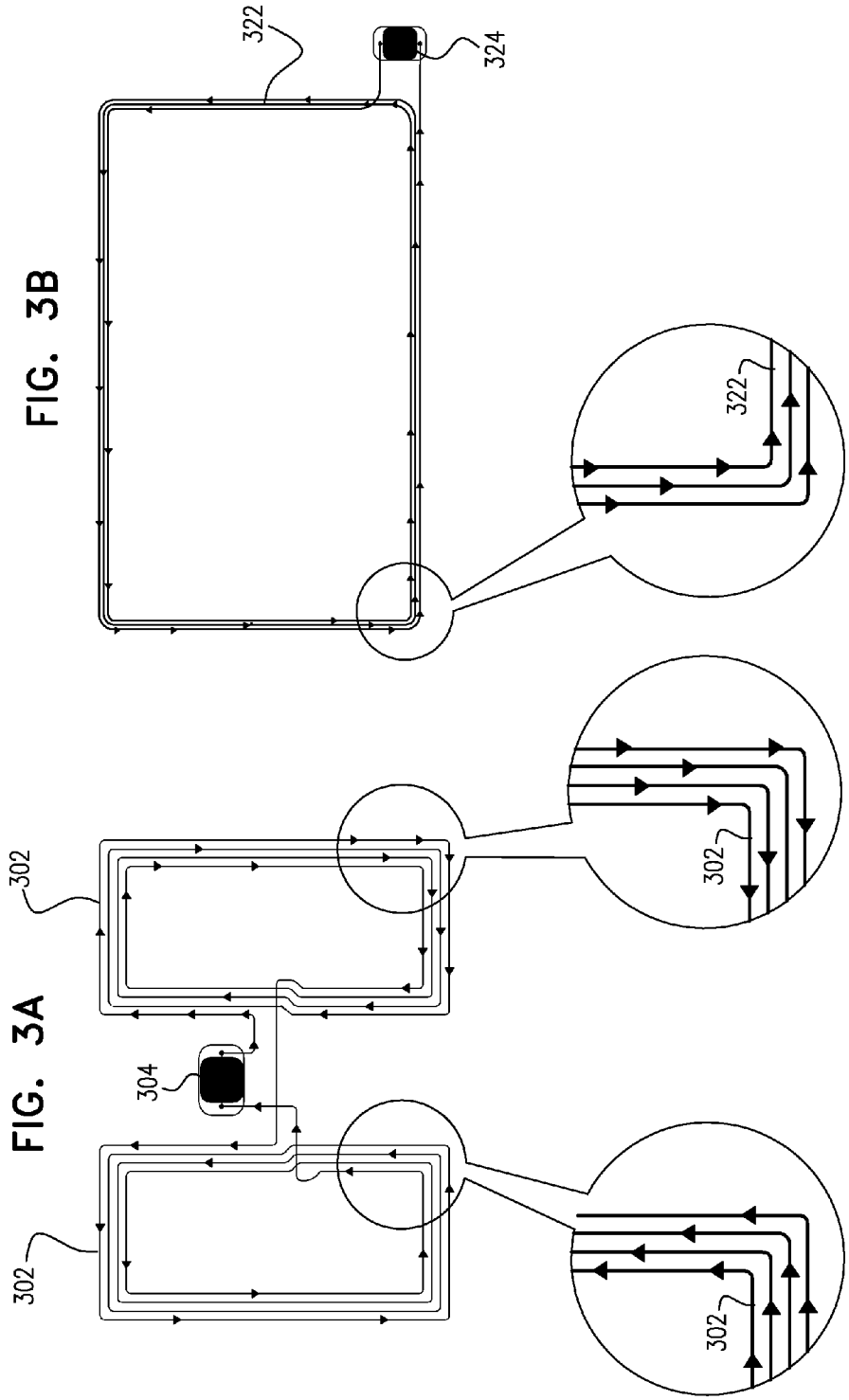

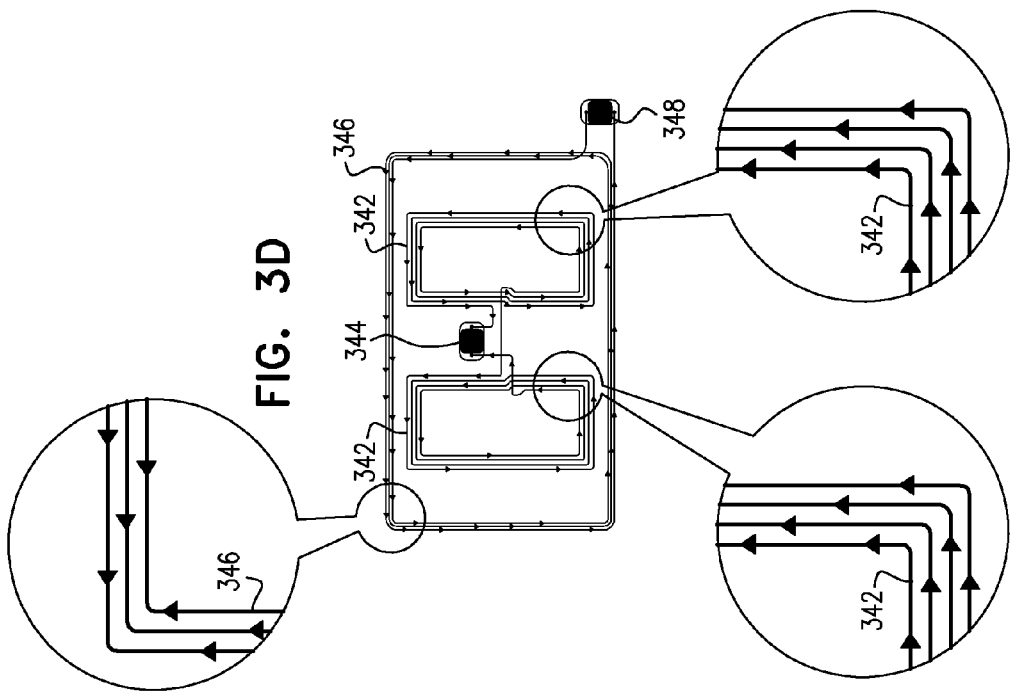
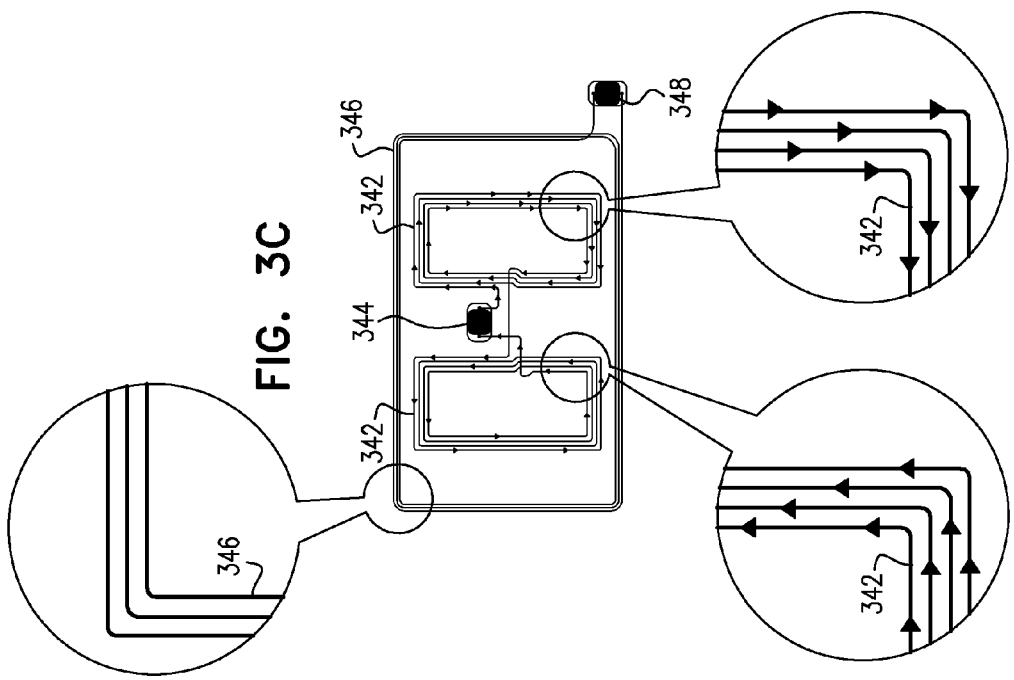

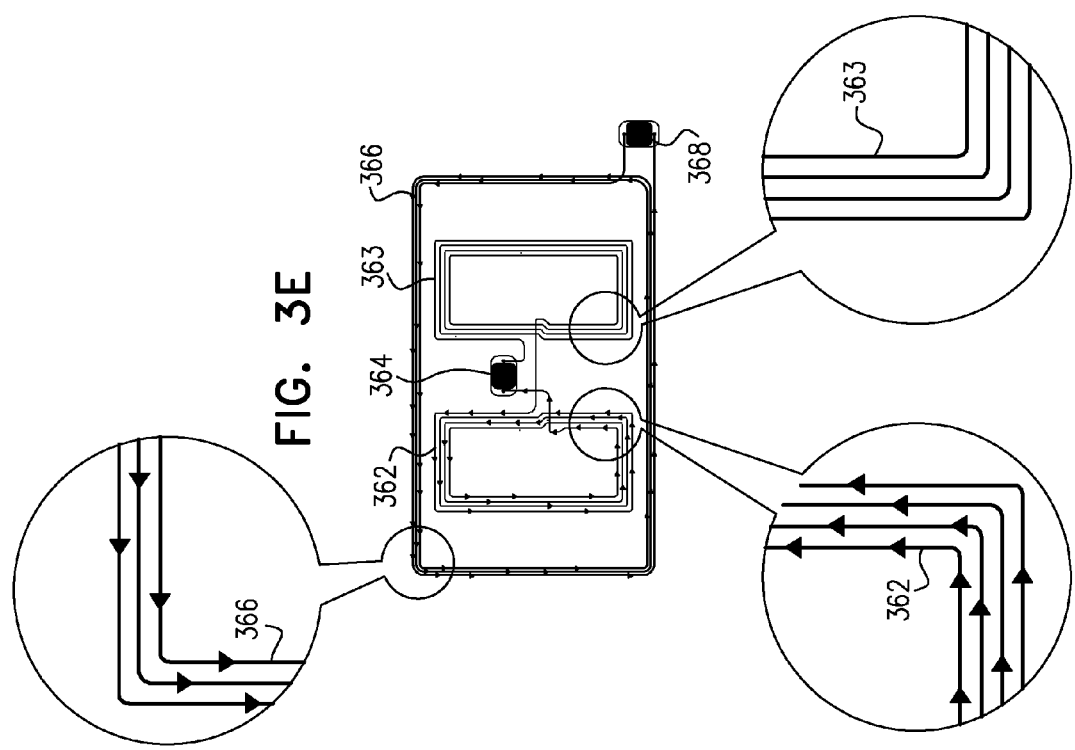

DECOUPLED CONTACTLESS BI-DIRECTIONAL SYSTEMS AND METHODS

FIELD OF THE INVENTION

The present invention relates to decoupled contactless bi-directional systems and methods.

BACKGROUND OF THE INVENTION

The following patents, patent publications and publications are believed to represent the current state of the art:

U.S. Pat. Nos. 4,135,183; 5,884,271; 7,268,687; 7,591,415; 7,806,333; and 7,834,816;

U.S. Published Patent Application Nos.: 2007/0096924 and 2010/0213261;

Japanese Patent JP3832363;

Bernhard et al., RFID in Metallic Environment, http://www.rfid-systech.eu/20070613_3A_1010_Bernhard_RFIDInMetallicEnvironment.PDF; and AAN PT9S Long Range Antenna for Cattle ID, http://www.trovan.com/products/FDXB/FDXBfixed/FDXB-fixed.html, commercially available from NSG Digital Systems of Kedah, Malaysia.

SUMMARY OF THE INVENTION

The present invention provides decoupled bi-directional systems and methods.

There is thus provided in accordance with a preferred embodiment of the present invention a contactless bi-directional device including first and second generally mutually electromagnetically decoupled contactless loop antennas which are arranged in at least partially mutually overlapping orientation, first and second contactless communication chips, each of the first and second communications chips being connected to a corresponding one of the generally mutually electromagnetically decoupled contactless loop antennas, thereby providing bi-directional communication.

In accordance with a preferred embodiment of the present invention the first contactless loop antenna circumscribes a first area and the second contactless loop antenna lies entirely within a volume defined by a projection of the first area in a direction perpendicular thereto. Preferably, the second contactless loop antenna includes a pair of at least partially non-mutually overlapping generally coplanar loops. Preferably, the pair of at least partially non-mutually overlapping generally coplanar loops are wound in mutually opposite directions.

Preferably, the pair of at least partially non-mutually overlapping generally coplanar loops are interconnected in series and are connected to the second contactless communication chip. Alternatively, the pair of at least partially non-mutually overlapping generally coplanar loops are interconnected in parallel and are connected to the second contactless communication chip.

In accordance with a preferred embodiment of the present invention the pair of at least partially non-mutually overlapping generally coplanar loops are operable for mutually cancelling corresponding electric voltages induced thereon when the pair of coplanar loops are together exposed to a generally uniform electromagnetic field. Additionally, the pair of at least partially non-mutually overlapping generally coplanar loops are operable for adding electric voltage induced thereon when individual ones of the pair of coplanar loops are exposed to generally mutually opposite electromagnetic fields.

Preferably, the first contactless loop antenna circumscribes a first area and at least a mutually identical portion of each of the pair of at least partially non-mutually overlapping generally coplanar loops lies within a volume defined by a projection of the first area in a direction perpendicular thereto.

Preferably, the first contactless loop antenna forms part of a contactless electronic passport. Preferably, the second contactless loop antenna forms part of a contactless electronic visa. Preferably, the first and second contactless loop antennas are each mounted on a separate page of a multi-page passport. Alternatively, the first and second contactless loop antennas are both mounted on a single page of a multi-page passport. Preferably, the first and second contactless communication chips respectively store passport data and visa data.

There is also provided in accordance with another preferred embodiment of the present invention a contactless bi-directional system including first and second generally mutually electromagnetically decoupled contactless loop antennas which are arranged in at least partially mutually overlapping orientation, first and second contactless communication chips, each of the first and second communications chips being connected to a corresponding one of the generally mutually electromagnetically decoupled contactless loop antennas, thereby providing bi-directional communication, and at least one communicator operative to communicate with at least one of the first and second contactless communication chips.

Preferably, at least one of the first and second contactless communication chips are powered by the at least one communicator. Preferably, the at least one communicator includes first and second communicators, the first communicator communicating exclusively with the first chip via the first contactless loop antenna. Additionally, the second communicator communicates exclusively with the second chip via the second contactless loop antenna.

In accordance with a preferred embodiment of the present invention the at least one communicator includes first and second communicators, the first communicator communicating with and powering the first chip exclusively via the first contactless loop antenna. Additionally, the second communicator communicates with and powers the second chip exclusively via the second contactless loop antenna.

Preferably, the first contactless loop antenna circumscribes a first area and the second contactless loop antenna lies entirely within a volume defined by a projection of the first area in a direction perpendicular thereto.

Preferably, the second contactless loop antenna includes a pair of at least partially non-mutually overlapping generally coplanar loops. Additionally, the pair of at least partially non-mutually overlapping generally coplanar loops are wound in mutually opposite directions.

In accordance with a preferred embodiment of the present invention the pair of at least partially non-mutually overlapping generally coplanar loops are interconnected in series and are connected to the second contactless communication chip. Alternatively, the pair of at least partially non-mutually overlapping generally coplanar loops are interconnected in parallel and are connected to the second contactless communication chip.

In accordance with a preferred embodiment of the present invention the pair of at least partially non-mutually overlapping generally coplanar loops are operable for mutually cancelling corresponding electric voltages induced thereon when the pair of coplanar loops are together exposed to a generally uniform electromagnetic field. Alternatively, the pair of at least partially non-mutually overlapping generally coplanar loops are operable for adding electric voltages induced thereon when individual ones of the pair of coplanar loops are exposed to generally mutually opposite electromagnetic fields.

Preferably, the first contactless loop antenna circumscribes a first area and at least a mutually identical portion of each of the pair of at least partially non-mutually overlapping generally coplanar loops lies within a volume defined by a projection of the first area in a direction perpendicular thereto.

Preferably, the first contactless loop antenna forms part of a contactless electronic passport and the first communicator is a passport reader. Preferably, the second contactless loop antenna forms part of a contactless electronic visa and the second communicator is a visa reader.

Preferably, the first and second contactless loop antennas are each mounted on a separate page of a multi-page passport. Alternatively, the first and second contactless loop antennas are both mounted on a single page of a multi-page passport.

Preferably, the first and second contactless communication chips respectively store passport data and visa data.

In accordance with a preferred embodiment of the present invention the first and second communicators include respective first and second generally mutually electromagnetically decoupled communicator contactless loop antennas. Preferably, the first communicator contactless loop antenna circumscribes a first area and the second communicator contactless loop antenna lies entirely within a volume defined by a projection of the first area in a direction perpendicular thereto.

Preferably, the second communicator contactless loop antenna includes a pair of at least partially non-mutually overlapping generally coplanar communicator loops. Preferably, the pair of at least partially non-mutually overlapping generally coplanar communicator loops are wound in mutually opposite directions. Preferably, the first communicator contactless loop antenna circumscribes a first area and at least a mutually identical portion of each of the pair of at least partially non-mutually overlapping generally coplanar communicator loops lies within a volume defined by a projection of the first area in a direction perpendicular thereto.

BRIEF DESCRIPTION OF THE DRAWINGS

The present invention will be understood and appreciated more fully from the following detailed description, taken in conjunction with the drawings in which:

FIGS. 1A and 1B are simplified pictorial illustrations of one stage in the operation of a contactless bi-directional system, constructed and operative in accordance with a preferred embodiment of the present invention;

FIGS. 3A, 3B, 3C, 3D and 3E are simplified pictorial illustrations of electric voltages induced in contactless loop antennas which are part of the system of FIGS. 1A-2C.

DETAILED DESCRIPTION OF PREFERRED EMBODIMENTS

Figure 1A:
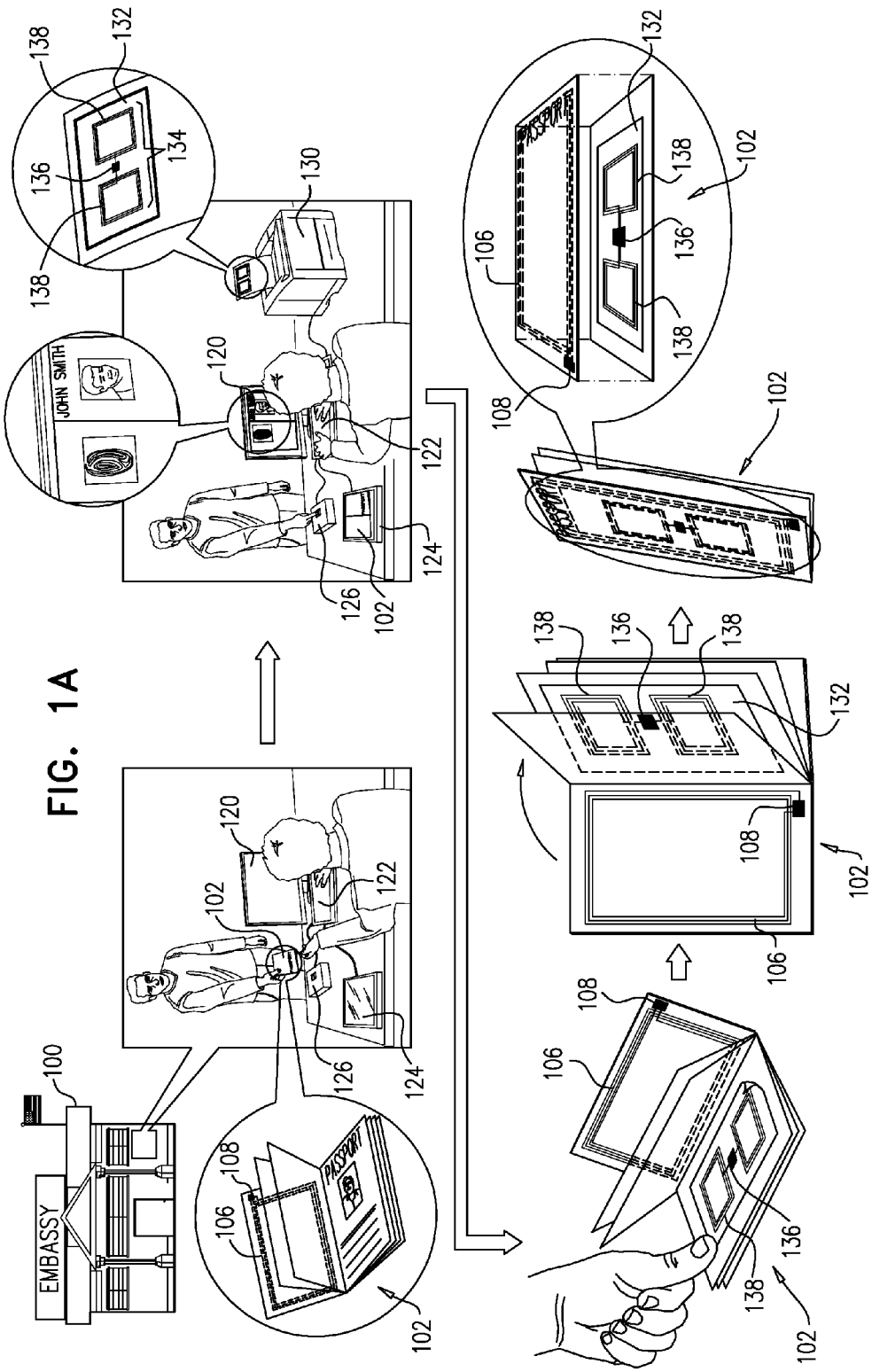
Figure 2A:
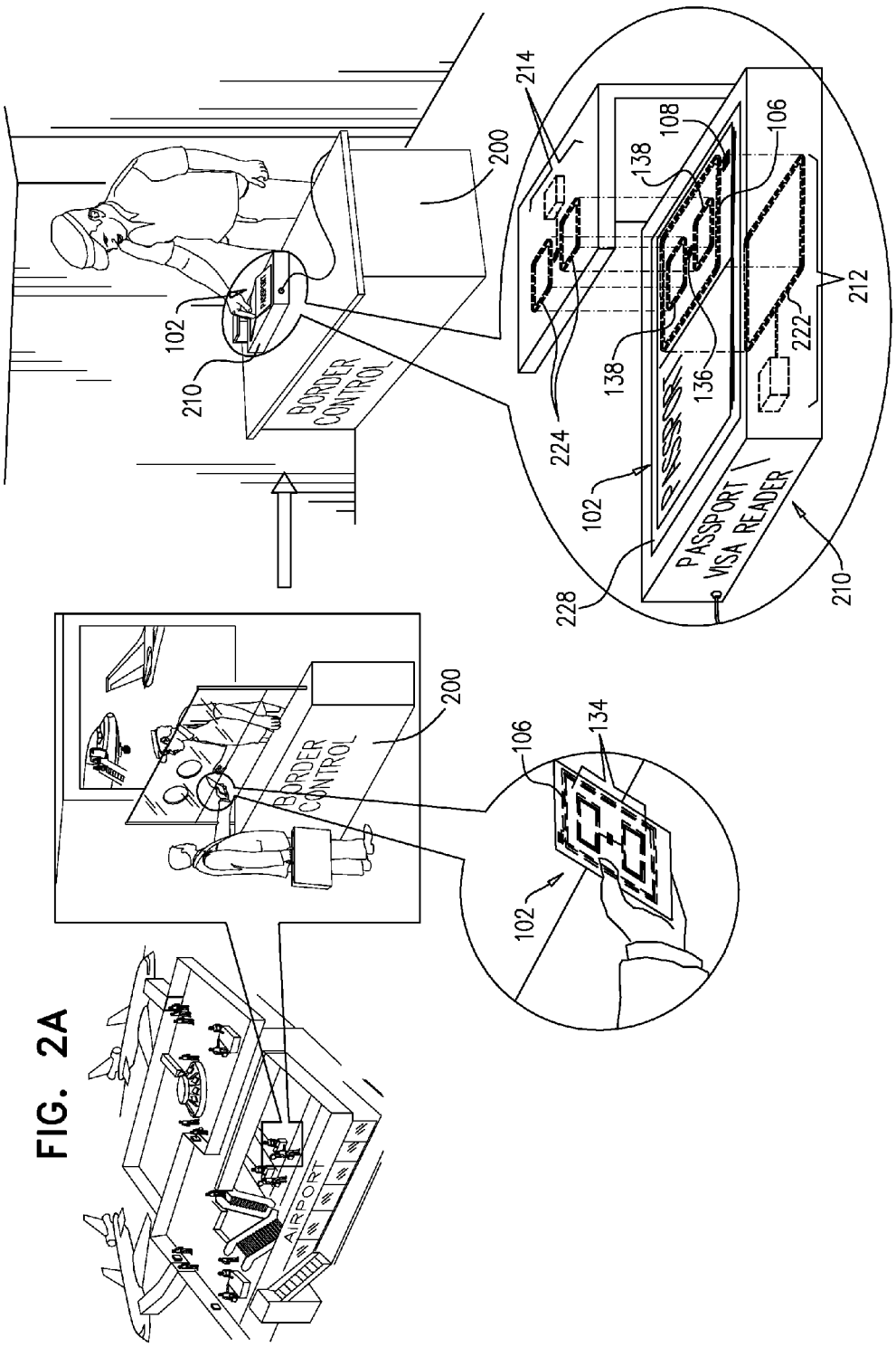
FIGS. 2A, 2B and 2C are simplified pictorial illustrations of various embodiments of another stage in the operation of the system of FIGS. 1A and 1B.
Figure 2B:
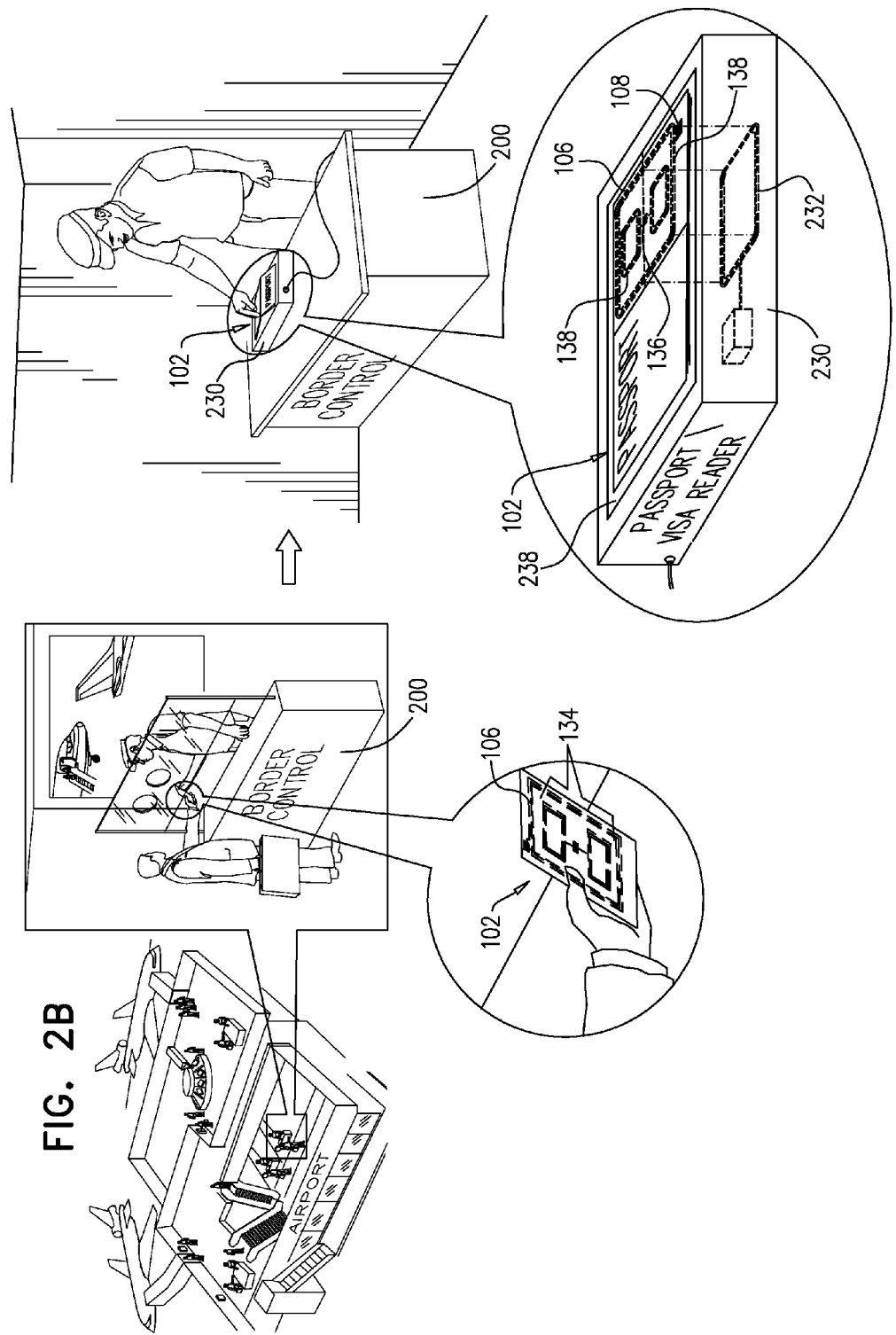
Figure 2C:
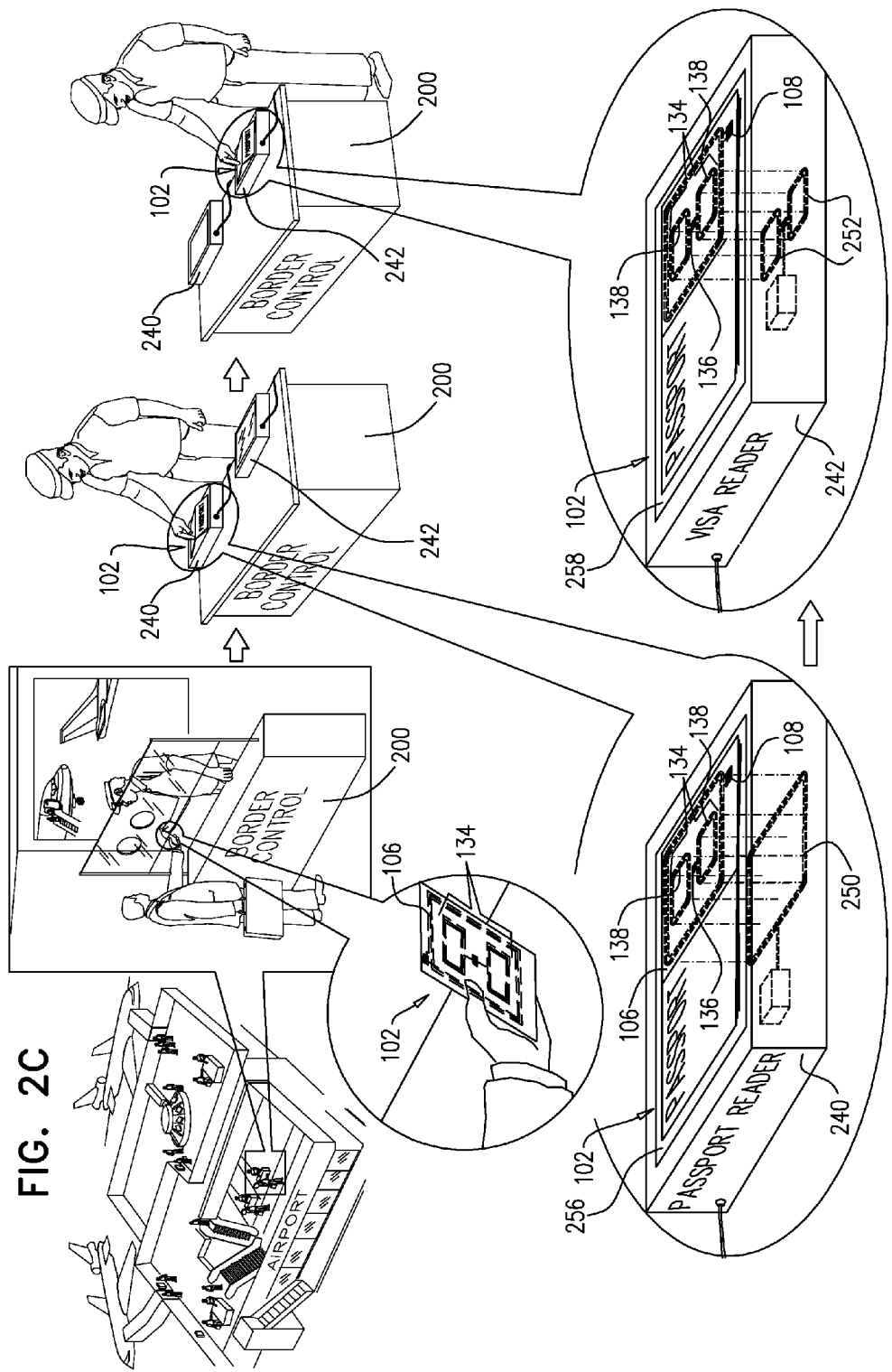

Reference is now made to FIGS. 1A and 1B, which are simplified pictorial illustrations of one stage in the operation of a contactless bi-directional system, constructed and operative in accordance with a preferred embodiment of the present invention, and to FIGS. 2A, 2B and 2C, which are simplified pictorial illustrations of another stage in the operation of the system of FIGS. 1A and 1B. The contactless bi-directional system of FIGS. 1A-2C preferably comprises first and second generally mutually electromagnetically decoupled contactless loop antennas which are arranged in at least partially mutually overlapping orientation, first and second contactless communication chips, each of the first and second communications chips being connected to a corresponding one of the generally mutually electromagnetically decoupled contactless loop antennas, thereby providing bi-directional communication, and at least one communicator operative to communicate with at least one of the first and second contactless communication chips.

It is a particular feature of the present invention that the contactless loop antennas are electromagnetically decoupled, whereby changes to the operating parameters of the first contactless loop antenna by the presence of the second contactless loop antenna are minimized, and whereby electromagnetic coupling between the second contactless loop antenna and a communicator communicating with the first contactless chip is minimized. The decoupling is operative to enable a first communicator to communicate with a first contactless communication chip while preventing the first communicator from communicating with a second contactless communication chip.

It is another particular feature of the present invention that the second communicator is arranged to be electromagnetically decoupled from the first contactless loop antenna while being strongly coupled to the second contactless loop antenna, thereby enabling a second communicator to communicate with the second contactless communication chip while preventing the second communicator from communicating with the first contactless communication chip.

As shown in FIGS. 1A & 1B, on a particular date such as Jan. 15, 2011, an individual such as Mr. John Smith enters an embassy 100 of a foreign country and requests to be issued a travel visa. Mr. Smith provides his passport 102 to a staff member of the embassy, as well as additional personal identification information such as, for example, a name, a picture, and a fingerprint. As clearly seen in FIGS. 1A & 1B, passport 102 includes a passport contactless loop antenna 106 generally centrally fastened to an inner cover of passport 102 and a passport chip module 108 connected thereto. It is appreciated that passport chip module 108 is operable to be activated by voltage induced in passport contactless loop antenna 106.

As further shown in FIGS. 1A & 1B, the staff member preferably enters Mr. Smith's personal identification information into a visa issuing computer 120 preferably via at least one of a keyboard 122, a passport reader 124 and a fingerprint reader 126. It is appreciated that passport reader 124 may be an optical reader operative to optically scan information printed in passport 102 or a contactless communicator operative to communicate with passport chip module 108 of passport 102.

Upon deciding to issue a visa to Mr. Smith, the staff member employs a visa printer 130 to print an adhesive visa sticker 132 for fastening into passport 102. As clearly seen in FIGS. 1A & 1B, visa sticker 132 includes a visa contactless loop antenna 134 generally centered on visa sticker 132 and a visa chip module 136. Visa contactless loop antenna 134 preferably includes two non-mutually overlapping generally coplanar loops 138 which are wound in mutually opposite directions, and which are connected to visa chip module 136. As yet further shown in FIGS. 1A & 1B, visa sticker 132 is fastened to passport 102. It is appreciated that visa sticker 132 may be fastened to the inner cover of passport 102 within an area circumscribed by contactless loop antenna 106 as shown in FIG. 1A, or to an alternative page of passport 102 as shown in FIG. 1B.

It is a particular feature of the present invention that passport contactless loop antenna 106 and visa contactless loop antenna 134 are each fastened to a page of passport 102, and that visa contactless loop antenna 134 lies entirely within a volume defined by a projection of an area circumscribed by passport contactless loop antenna 106 in a direction perpendicular thereto. It is appreciated that alternatively, a mutually identical portion of each of loops 138 lies within a volume defined by a projection of an area circumscribed by passport contactless loop antenna 106 in a direction perpendicular thereto.

It is also appreciated that visa chip module is operable to be activated by voltage induced in visa contactless loop antenna 134, which voltage is a combination of voltages induced in each of loops 138. It is a particular feature of the present invention that when visa contactless loop antenna 134 is placed within a homogenous electric field, such as within a field operative to induce voltage in contactless loop antenna 106, generally equal electric voltages of mutually opposite polarity are induced in mutually oppositely wound loops 138, thereby causing the total voltage induced in visa contactless loop antenna 134 to be generally null.

Turning now to FIG. 2A, it is shown that on a later date, such as on Jan. 30, 2011, Mr. Smith arrives at a border control checkpoint 200 at an airport of the foreign country. Mr. Smith provides his passport 102 which includes passport contactless loop antenna 106, passport chip module 108, visa contactless loop antenna 134 and visa chip module 136 to the staff member of the checkpoint. The staff member then proceeds to place passport 102 onto a passport\visa communicator 210 and employs communicator 210 to retrieve passport information from passport chip module 108 and visa information from visa chip module 136. As shown in FIG. 2A, passport\visa reader 210 includes a passport communicator element 212 operative to communicate with passport chip module 108 and a visa communicator element 214 operative to communicate with visa chip module 136.

Passport communicator element 212 preferably includes a passport communicator electromagnetic field generating coil 222 generally corresponding to the dimensions of passport contactless loop antenna 106. Visa communicator element 214 preferably includes mutually oppositely wound visa reader electromagnetic field generating coils 224 generally corresponding to the dimensions of loops 138.

Passport\visa communicator 210 also includes a reading surface 228 having dimensions which are generally similar to the dimensions of a standard passport. When passport 102 is placed upon reading surface 228, passport contactless loop antenna 106 is aligned generally opposite passport reader electromagnetic field generating coil 222, and loops 138 of visa contactless loop antenna 134 are aligned generally opposite visa reader electromagnetic field generating coils 224.

It is appreciated that when employing passport communicator element 212 to communicate with passport chip module 108, passport communicator element 212 employs electromagnetic field generating coil 222 to produce a passport communicating electromagnetic field which induces an electric voltage within passport contactless loop antenna 106, thereby activating passport chip module 108 which is connected thereto by inducing electric voltage therein. Activation of passport chip module 108 is then operative to enable chip module 108 to communicate passport information stored therewithin to passport communicator element 212.

It is a particular feature of this embodiment of the present invention that the passport communicating electromagnetic field produced by passport reader element 212 also induces generally equal voltages of mutually opposite polarity in each of mutually oppositely wound loops 138 of visa contactless loop antenna 134, thereby generating a generally null net voltage into visa chip module 136 connected to loops 138, thereby causing visa chip module 136 to remain in an inactivated state, and thereby preventing passport communicator element 212 from communicating with visa chip module 136.

It is also appreciated that when employing visa communicator element 214 to communicate with visa chip module 136, visa reader element 214 employs mutually oppositely wound visa reader electromagnetic field generating coils 224 to produce two mutually opposite visa communicating electromagnetic fields which induce generally equal electric voltages of identical polarity within each of mutually oppositely wound loops 138, thereby activating visa chip module 136 which is connected thereto by inducing electric voltage therein. Activation of visa chip module 136 is then operative to enable visa chip module 136 to communicate visa information stored therewithin to visa reader element 214.

It is another particular feature of this embodiment of the present invention that the two mutually opposite visa communicating electromagnetic fields produced by visa reader element 214 induce a generally null net voltage into contactless loop antenna 106 and in chip module 108 connected thereto, thereby causing passport chip module 108 to remain in an inactivated state.

It is therefore yet another particular feature of this embodiment of the present invention that passport contactless loop antenna 106 and visa contactless loop antenna 134 are operatively decoupled, whereby the passport communicating electromagnetic field produced by passport reader element 212 is operative to enable retrieving only information stored on passport chip module 108, and visa reader element 214 is operative to enable retrieving only information stored on visa chip module 136.

In the embodiment illustrated in FIG. 2B, it is shown that the staff member places passport 102 onto a combined passport\visa communicator 230 and employs communicator 230 to retrieve passport information from passport chip module 108 and visa information from visa chip module 136. Communicator 230 is operative to communicate with both passport chip module 108 and visa chip module 136.

Combined passport\visa communicator 230 preferably includes an electromagnetic field generating coil 232 generally corresponding to one half of the dimensions of contactless loop antenna 106, as clearly shown in FIG. 2B.

Combined passport\visa communicator 230 also includes a reading surface 238 having dimensions which are generally similar to the size of a standard passport. When passport 102 is placed upon reading surface 238, part of passport contactless loop antenna 106 is aligned generally opposite part of electromagnetic field generating coil 232, and one of loops 138 of visa contactless loop antenna 134 is aligned generally opposite the interior of the loop formed by visa reader electromagnetic field generating coil 232.

It is appreciated that when employing combined passport\visa communicator 230 to communicate with passport chip module 108 and with visa chip module 136, combined passport\visa communicator 230 employs electromagnetic field generating coil 232 to produce an electromagnetic field which induces an electric voltage within both passport contactless loop antenna 106 and generally in one of loops 138, thereby activating passport chip module 108 and visa chip module 136 respectively connected thereto by inducing electric voltage therein. Activation of chip modules 108 and 136 are then operative to enable chip modules 108 and 136 to communicate passport information and visa information respectively stored therewithin to combined passport\visa communicator 230.

It is a particular feature of this embodiment of the present invention that simultaneous activation of chip modules 108 and 136 is operative to enable retrieving passport information from passport chip module 106 and from visa chip module 136 by a single combined passport\visa communicator 230.

In the embodiment illustrated in FIG. 2C, it is shown that the staff member first places passport 102 onto a passport communicator 240 to retrieve information stored on passport chip module 108, and then proceeds to place passport 102 onto a separate visa communicator 242 to retrieve information stored on visa chip module 136.

Passport communicator 240 preferably includes a passport communicator electromagnetic field generating coil 250 generally corresponding to the dimensions of passport contactless loop antenna 106. Visa communicator 242 preferably includes mutually oppositely wound visa reader electromagnetic field generating coils 252 generally corresponding to the dimensions of loops 138.

Passport communicator 240 also includes a passport reading surface 256 having dimensions which are generally similar to the size of a standard passport. When passport 102 is placed upon reading surface 256, passport contactless loop antenna 106 is aligned generally opposite passport communicator electromagnetic field generating coil 250.

Visa communicator 242 also includes a visa reading surface 258 having dimensions which are generally similar to the size of a standard passport. When passport 102 is placed upon reading surface 256, loops 138 are aligned generally opposite visa communicator electromagnetic field generating coils 252.

It is appreciated that when employing passport communicator 240 to communicate with passport chip module 108, passport communicator 240 employs reader electromagnetic field generating coil 250 to produce a passport communicating electromagnetic field which induces an electric voltage within passport contactless loop antenna 106, thereby activating chip module 108 which is connected thereto by inducing electric voltage therein. Activation of passport chip module 108 is then operative to enable chip module 108 to communicate passport information stored therewithin to passport communicator 240.

It is a particular feature of this embodiment of the present invention that the passport communicating electromagnetic field produced by passport reader 240 also induces generally equal voltages of mutually opposite polarity in each of mutually oppositely wound loops 138 of visa contactless loop antenna 134, thereby generating a generally null net current in visa chip module 136 connected to loops 138 and thereby causing visa chip module 136 to remain in an inactivated state.

It is also appreciated that when employing visa communicator 242 to communicate with visa chip module 136, visa reader 242 employs mutually oppositely wound visa reader electromagnetic field generating coils 252 to produce two mutually opposite visa communicating electromagnetic fields which induce generally equal electric voltages of identical polarity within each of mutually oppositely wound loops 138, thereby activating visa chip module 136 which is connected thereto by inducing electric voltage therein. Activation of chip module 136 is then operative to enable chip module 136 to communicate visa information stored therewithin to visa reader 242.

It is another particular feature of this embodiment of the present invention that the two mutually opposite visa reading electromagnetic field produced by visa reader 242 induce a generally null net voltage in contactless loop antenna 106 and in chip module 108 connected thereto, thereby causing passport chip module 108 to remain in an inactivated state.

It is therefore yet another particular feature of this embodiment of the present invention that passport contactless loop antenna 106 and visa contactless loop antenna 134 are operatively decoupled, whereby the passport communicating electromagnetic field produced by passport reader 240 is operative to enable retrieving only information stored on passport chip module 108, and visa reader 242 is operative to enable retrieving only information stored on visa chip module 136.

Reference is now made to FIGS. 3A, 3B, 3C, 3D and 3E, which are simplified pictorial illustrations of electric voltages induced in contactless loop antennas which are part of the system of FIGS. 1A-2C.

In the example of FIG. 3A, two contactless loop antennas 302 are wound in mutually opposite directions, and are serially connected to a chip module 304. When placed within an electromagnetic field generated by two mutually oppositely wound electromagnetic field generating coils such as coils 224 of visa communicator element 214 illustrated in FIG. 2A or coils 252 of visa communicator 242 illustrated in FIG. 2C, generally equal electric voltages of identical polarity are induced within each of oppositely wound contactless loop antennas 302, thereby generating an activating electric voltage in chip module 304.

In the example of FIG. 3B, a contactless loop antenna 322 is connected to a chip module 324. When placed within an electromagnetic field generated by an electromagnetic field generating coil such as coil 222 of passport communicator element 212 illustrated in FIG. 2A or coil 250 of passport reader 240 illustrated in FIG. 2C, an electric voltage is induced within contactless loop antenna 322, thereby generating an activating electric voltage in chip module 324.

In the examples of FIGS. 3C & 3D, two inner contactless loop antennas 342 which are wound in mutually opposite directions are serially connected to a chip module 344, and an outer contactless loop antenna 346 is connected to a chip module 348.

As shown in FIG. 3C, when placed within an electromagnetic field generated by two oppositely wound electromagnetic field generating coils such as coils 224 of visa communicator element 214 illustrated in FIG. 2A or coils 252 of visa communicator 242 illustrated in FIG. 2C, generally equal electric voltages of identical polarity are induced within each of oppositely wound inner contactless loop antennas 342, thereby generating an activating electric voltage in chip module 344, while generating a generally null voltage in outer contactless loop antenna 346.

As shown in FIG. 3D, when placed within an electromagnetic field generated by an electromagnetic field generating coil such as coil 222 of passport communicator element 212 illustrated in FIG. 2A or coil 250 of passport communicator 240 illustrated in FIG. 2C, an electric voltage is induced within outer contactless loop antenna 346, thereby generating an activating electric voltage in chip module 348 while inducing generally equal electric voltages of mutually opposite polarity in each of mutually oppositely wound inner contactless loop antennas 342, thereby generating a generally null net voltage in chip module 344 and thereby causing chip module 344 to remain in an inactivated state.

In the example of FIG. 3E, two inner contactless loop antennas 362 and 363 which are wound in mutually opposite directions are serially connected to a chip module 364, and an outer contactless loop antenna 366 is connected to a chip module 368. As shown in FIG. 3E, when smart card device 360 is placed within an electromagnetic field generated by one electromagnetic field generating coil such coil 232 of combined passport\visa communicator 230 illustrated in FIG. 2B, relatively strong electric voltages are induced within both inner contactless loop antenna 362 and outer contactless loop antenna 366 thereby generating activating electric voltages in both of chip modules 364 and 368, while generating a generally insignificant electric voltage in inner contactless loop antenna 363.

It will be appreciated by persons skilled in the art that the present invention is not limited by what has been particularly shown and described hereinabove. Rather the scope of the present invention includes combinations and subcombinations of various features described hereinabove as well as variations and modifications thereof which would occur to persons reading the foregoing and which are not in the prior art.

The invention claimed is:

1. A contactless bi-directional device comprising:
   first and second generally mutually electromagnetically decoupled contactless loop antennas which are arranged in at least partially mutually overlapping orientation;
   first and second contactless communication chips, each of said first and second communications chips being connected to a corresponding one of said generally mutually electromagnetically decoupled contactless loop antennas, thereby providing bi-directional communication said decoupling enabling a first communicator to electromagnetically communicate with the first contactless chip while preventing the first communicator from electromagnetically communicating with the second contactless communication chip, and
   wherein said second contactless loop antenna comprises a pair of at least partially non-mutually overlapping generally coplanar loops, said pair of at least partially non-mutually overlapping generally coplanar loops are wound in mutually opposite directions; and wherein the device is an electronic passport of at least one page wherein the first and second contactless communication chips respectively store passport data and visa data.

2. A contactless bi-directional device according to claim 1 and wherein said first contactless loop antenna circumscribes a first area and said second contactless loop antenna lies entirely within a volume defined by a projection of said first area in a direction perpendicular thereto.

3. A contactless bi-directional device according to claim 1 and wherein said pair of at least partially non-mutually overlapping generally coplanar loops are interconnected in series and are connected to said second contactless communication chip.

4. A contactless bi-directional device according to claim 1 and wherein said pair of at least partially non-mutually overlapping generally coplanar loops are interconnected in parallel and are connected to said second contactless communication chip.

5. A contactless bi-directional device according to claim 1 and wherein said pair of at least partially non-mutually overlapping generally coplanar loops are operable for mutually cancelling corresponding electric voltages induced thereon when said pair of coplanar loops are together exposed to a generally uniform electromagnetic field.

6. A contactless bi-directional device according to claim 1 and wherein said pair of at least partially non-mutually overlapping generally coplanar loops are operable for adding electric voltage induced thereon when individual ones of said pair of coplanar loops are exposed to generally mutually opposite electromagnetic fields.

7. A contactless bi-directional device according to claim 1 and wherein said first contactless loop antenna circumscribes a first area and at least a mutually identical portion of each of said pair of at least partially non-mutually overlapping generally coplanar loops lies within a volume defined by a projection of said first area in a direction perpendicular thereto.

8. A contactless bi-directional device according to claim 1 and wherein said first contactless loop antenna forms part of a contactless electronic passport.

9. A contactless bi-directional device according to claim 1 and wherein said second contactless loop antenna forms part of a contactless electronic visa.

10. A contactless bi-directional device according to claim 1 and wherein said first and second contactless loop antennas are each mounted on a separate page of a multi-page passport.

11. A contactless bi-directional device according to claim 1 and wherein said first and second contactless loop antennas are both mounted on a single page of a multi-page passport.

12. A contactless bi-directional system comprising: an electronic passport of at least one page, said electronic passport comprising first and second generally mutually electromagnetically decoupled contact loop antennas which are arranged in at least partially mutually overlapping orientation; said electronic passport further comprising first and second contactless communication chips, each of said first and second communication chips being connected to a corresponding one of said generally mutually electromagnetically decoupled contactless loop antennas, thereby providing bi-directional communication wherein said first and second contactless communication chips respectively store passport data and visa data; at least one communicator operative to communicate with at least one of said first and second contactless communication chips, said decoupling enabling said at least one communicator to electromagnetically communicate with said first contactless chip while preventing said at least one communicator from electromagnetically communicating with said second contactless communication chip, and wherein said second contactless loop antenna comprises a pair of at least partially non-mutually overlapping generally coplanar loops, said pair of at least partially non-mutually overlapping generally coplanar loops are wound in mutually opposite directions.

13. A contactless bi-directional system according to claim 12 and wherein at least one of said first and second contactless communication chips are powered by said at least one communicator.

14. A contactless bi-directional system according to claim 12 and wherein said at least one communicator comprises first and second communicators, said first communicator communicating exclusively with said first chip via said first contactless loop antenna.

15. A contactless bi-directional system according to claim 12 and wherein said at least one communicator comprises first and second communicators, said second communicator communication exclusively with said second chip via said second contactless loop antenna.

16. A contactless bi-directional system according to claim 12 and wherein said at least one communicator comprises first and second communicators, said first communicator communicating with and powering said first chip exclusively via said first contactless loop antenna.

17. A contactless bi-directional system according to claim 12 and wherein said at least one communicator comprises first and second communicators, said second communicator communicating with and powering said second chip exclusively via said second contactless loop antenna.

18. A contactless bi-directional system according to claim 12 and wherein said first contactless loop antenna circumscribes a first area and said second contactless loop antenna lies entirely within a volume defined by a projection of said first area in a direction perpendicular thereto.

19. A contactless bi-directional system according to claim 12 and wherein said pair of at least partially non-mutually overlapping generally coplanar loops are interconnected in series and are connected to said second contactless communication chip.

20. A contactless bi-directional system according to claim 12 and wherein said pair of at least partially non-mutually overlapping generally coplanar loops are interconnected in parallel and are connected to said second contactless communication chip.

21. A contactless bi-directional system according to claim 12 and wherein said pair of at least partially non-mutually overlapping generally coplanar loops are operable for mutually cancelling corresponding electric voltages induced thereon when said pair of coplanar loops are together exposed to a generally uniform electromagnetic field.

22. A contactless bi-directional system according to claim 12 and wherein said pair of at least partially non-mutually overlapping generally coplanar loops are operable for adding electric voltages induced thereon when individual ones of said pair of coplanar loops are exposed to generally mutually opposite electromagnetic fields.

23. A contactless bi-directional system according to claim 12 and wherein said first contactless loop antenna circumscribes a first area and at least a mutually identical portion of each of said pair of at least partially non-mutually overlapping generally coplanar loops lies within a volume defined by a projection of said first area in a direction perpendicular thereto.

24. A contactless bi-directional system according to claim 12 and wherein said first contactless loop antenna forms part of a contactless electronic passport and said first communicator is a passport reader.

25. A contactless bi-directional system according to claim 12 and wherein said second contactless loop antenna forms part of a contactless electronic visa and said second communicator is a visa reader.

26. A contactless bi-directional system according to claim 12 and wherein said first and second contactless loop antennas are each mounted on a separate page of a multi-page passport.

27. A contactless bi-directional system according to claim 12 and wherein said first and second contactless loop antennas are both mounted on a single page of a multi-page passport.

28. A contactless bi-directional system according to claim 14 and wherein said first and second communicators comprise respective first and second generally mutually electromagnetically decoupled communicator contactless loop antennas.

29. A contactless bi-directional system according to claim 28 and wherein said first communicator contactless loop antenna circumscribes a first area and said second communicator contactless loop antenna lies entirely within a volume defined by a projection of said first area in a direction perpendicular thereto.

30. A contactless bi-directional system according to claim 28 and wherein said second communicator contactless loop antenna comprises a pair of at least partially non-mutually overlapping generally coplanar communicator loops.

31. A contactless bi-directional system according to claim 30 and wherein said pair of at least partially non-mutually overlapping generally coplanar communicator loops are wound in mutually opposite directions.

32. A contactless bi-directional system according to claim 30 and wherein said first communicator contactless loop antenna circumscribes a first area and at least a mutually identical portion of each of said pair of at least partially non-mutually overlapping generally coplanar communicator loops lies within a volume defined by a projection of said first area in a direction perpendicular thereto.

* * * * *